March 26, 1940.  P. F. GIESKIENG  2,195,209

LUBRICATION SYSTEM

Filed June 21, 1939

Inventor:
Paul F. Gieskieng
By
Martin E. Anderson
Attorney

Patented Mar. 26, 1940

2,195,209

UNITED STATES PATENT OFFICE 2,195,209

LUBRICATION SYSTEM

Paul F. Gieskieng, Denver, Colo., assignor of one-half to William A. Gieskieng, Denver, Colo.

Application June 21, 1939, Serial No. 280,370

7 Claims. (Cl. 184—7)

This invention relates to improvements in lubricating systems and has reference more particularly to a lubricating system intended for use with locomotives and similar machines.

A modern locomotive is provided with a mechanical stoker, a boiler feed water pump and an air compressor, all of which operate more or less intermittently and the air pump, in addition to its intermittent operation, also operates at greatly different speeds and this characteristic feature of operation makes it difficult to secure proper lubrication with the ordinary means now in use.

It is the principal object of this invention to produce a lubricating system that can be used in many different places, but which will be described in connection with a railway locomotive and associated machines and which shall be so designed and constructed that it will provide lubrication only when the machines are in actual operation.

Another object of the invention is to provide a system of lubrication that can be manually controlled as well as automatically.

A still further object of this invention is to provide a system of lubrication that shall be especially suited for a machine that operates at varied speeds such, for example, as an air compressor, that will provide continuous lubrication and at the same time provide additional lubrication when the compressor is operating at a high speed.

Another object of this invention is to produce a lubricating system in which the oil is circulated by means of a constantly operating pump and in which the oil flows in a closed path at a very low pressure, except during such times as some machine connected to the system is to be lubricated in which case the oil flow is automatically diverted into the machine under operation.

The above and other objects that may become apparent as this description proceeds are attained by means of a construction and an arrangement of parts that will now be described in detail and for this purpose reference will be had to the accompanying drawing in which the invention has been illustrated in a more or less diagrammatical manner and in which.

Figure 1:
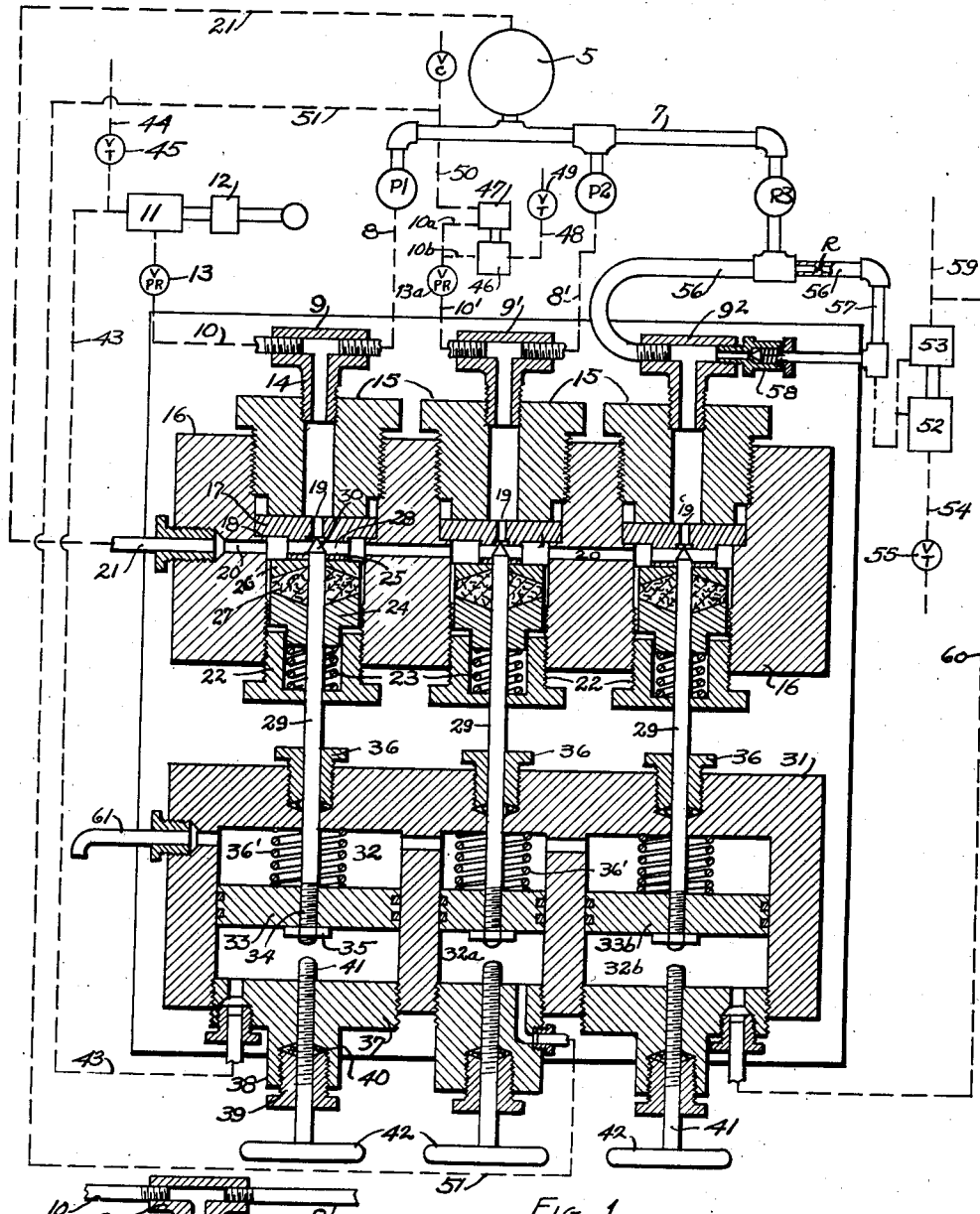
Figure 1 is a view showing the various elements forming the combination, in the relationship which they occupy and showing a portion of the apparatus in section.

In the drawing reference numeral 5 designates a reservoir containing the oil 6 which is employed in the lubrication.

In the drawing a pipe manifold 7 has been shown and connected with this manifold are three pumps P1, P2 and P3. These pumps are constantly operating and may be of any suitable type such as a piston and a cylinder type or a rotary type. The intake port of each pump is connected with the manifold 7 by conduits as shown. Since the three mechanisms illustrated on the drawing are practically identical, the description will be limited almost exclusively to the valve mechanism shown at the left in Figure 1 and with which the pump P1 is connected. A conduit 8 extends from the delivery port of the pump to a T pipe fitting which has been designated by reference numeral 9. It will be observed that conduit 8 is connected with one end of this fitting and that another conduit 10 extends from the other end thereof. Conduit 10 connects with the engine 11 which operates the coal stoker 12 and is provided with a pressure relief valve 13 that normally prevents oil from flowing through the engine, but which will open and permit such flow when the pressure exceeds a predetermined amount, which may vary to suit conditions.

The lateral extension 14 of the T 9 is connected with a tubular plug 15 that in turn is threadedly connected with a valve body 16. A removable plate 17 is positioned between the end of the tubular plug 15 and shoulder 18 and this plate is made of any suitable material and is provided with an opening 19 that communicates with a transverse opening 20 which extends through the wall of the valve body and is in communication with a copper tube 21 that forms a return conduit and extends to and opens into the reservoir 5 in the manner shown.

It is evident that when the pump P1 is operating, oil will flow through the conduit 8, through the T 9, thence through the opening in plug 15 through opening 19 into passage 20 and from thence through the tube 21 to the oil reservoir. Since these conduits and openings can be made of any size desired, it is evident that the oil can circulate without being subjected to any material pressure and there is therefore very little loss of power due to the operation of the pump at those times when the oil circulates through the pipes indicated.

Before describing further the path of the lubricating oil, the valve mechanism will now be described.

The valve body 16 has an opening extending transversely through the same and which is threaded at opposite ends. Plug 15 is threadedly connected at one end of this opening and plug 22 is similarly threadedly connected with the other end thereof. Plug 22 is cup-shaped or hollow, and contains a spring 23, one end of which abuts the movable member 24 which is provided with a conical depression at its center. It will be observed that the valve plate 17 is provided with a center projection 25 that serves as an abutment for the member 26 which cooperates with the member 24 to form a chamber for the reception of the packing material 27. The center projection of member 17 is provided with an opening 28 that extends through the same and which communicates with the passage 20.

A valve stem 29 passes through aligned openings in plug 22 and members 24 and 26 and in the end of the projection on member 17. The end of valve member 29 is conical as indicated at 30 and serves to close opening 19 when it is moved upwardly into engagement with the wall of this opening.

Valve member 29 is operated by a means which will now be described. A body 31 is provided with cylindrical openings 32, 32a and 35b, each of which corresponds to one of the valve mechanisms shown in valve base 16. Positioned in cylinder 32 is a piston 33 that is attached by means of threads 34 and a nut 35 with the valve stem 29. A stuffing box 36 guides the valve stem 29 and also serves to prevent leakage of gas or liquid from the cylindrical space above the piston 33. A helical spring 36' is positioned between the piston 33 and the bottom of cylinder 32 and has sufficient strength to move the piston 33 against the frictional resistance opposed by the piston and the valve stem. The open end of cylinder 32 is closed by means of a threaded plug 37 that is provided on its outer surface with a cylindrical projection 38 having a threaded opening for the reception of the threaded plug 39 which serves to compress the packing material 40. A threaded stem 41 passes through openings provided for this purpose in the plug 39 and in the plug 37 and this can be turned by means of a handwheel 42. The purpose of the threaded stem 41 is to move the valve stem 29 into valve closing position whenever desired and this is accomplished by rotating stem 41 in a direction to move it upwardly until its end engages the lower end of the valve stem 29 and by continuing the rotation, it is evident that the valve stem can be moved against the action of spring 36' until the conical portion 30 engages the valve seat and closes opening 19. Normally the end of stem 41 is so positioned that the valve stem 29 can move downwardly into a position in which the opening 19 is unobstructed. A pipe 43 is connected with the interior of cylinder 32, as shown in the drawing. Pipe 43 has been shown extended by a dotted line, which has been shown as connected with the steam engine 11 that operates the stoker. Pipe 44 designates a steam pipe connected with the boiler of the engine and the flow of steam through pipe 44 is controlled by the throttle valve 45. Whenever valve 45 is opened to allow steam to enter the engine 11, the pressure of the steam will be communicated to the interior of cylinder 32, through pipe 43 and the steam pressure thus introduced will move the piston 33 upwardly, thereby seating the valve 30 and closing opening 19.

Let us now consider a case in which pump P1 is constantly operating as above described, and in which a constant stream of oil is flowing through pipes 8 and 21 and that engine 11 is idle. Since the closed path from reservoir 5 to pump P1 and through the return conduit 21 offers very little resistance, it is obvious that no oil will pass to the engine on account of the presence in pipe 10 of the pressure relief valve 13. When the throttle valve 45 is opened, steam pressure will be communicated to the engine and to cylinder 32 in the manner already described whereupon the passage through opening 19 will be closed and as a result of this, the oil pressure in pipes 8 and 10 will immediately rise until it acquires a sufficient value to open the relief valve 13, whereupon oil will begin to flow to the engine. As soon as the throttle valve 45 is closed, the steam pressure in pipe 43 will decrease, thereupon permitting spring 36' to move the piston 33 downwardly with the result that oil can now flow through opening 19 and return to the reservoir through pipe 21.

From the above description it will be apparent that when a steam engine is equipped with the lubricating apparatus just described, it will automatically receive lubrication whenever steam pressure is delivered to the engine for operating it and that as soon as the throttle valve is closed and the engine stops, the lubrication will also cease.

Reference numeral 46 designates the engine portion of a feed water pump whose pump portion has been designated by reference numeral 47. Steam is delivered to the engine 46 through a pipe 48 and its flow is controlled by a throttle valve 49. Extending from the T 9' is a pipe 10' that has two branches 10a and 10b that communicate respectively with the pump 47 and the engine 46. A pressure relief valve 13a prevents oil from flowing except when the pressure in T 9' increases over a predetermined amount.

The water leaves the pump through a pipe 50 and connected with this pipe is a pipe or tube 51 whose other end communicates with the cylinder 32a in the same manner as pipe 43 communicates with cylinder 32.

Pump P2 is constantly operating and normally produces a flow of oil through the pipe 8' through the interior of plug 15 through the opening 19 and thence through passage 20 and pipe 21 back to the reservoir 5. The operation of the second valve by means of which the lubrication of a water feed pump is controlled is as follows: When valve 49 is opened to admit steam to the cylinders 46 pump 47 will begin to operate and feed water will be put under pressure in pipes 50 and 51 whereupon the piston in cylinder 32a will be moved upwardly against the force exerted by spring 36' until valve rod 29 closes opening 19. The pressure of the oil will now increase in pipe 10' until valve 13a opens and permits oil to flow through pipe 10a and 10b to the feed water pump and to the steam cylinders and lubricates them.

The third valve, the one to the right in Figure 1, is constructed exactly as the other two, but is used for lubricating the air compressor which consists of the engine portion 52 and the air pump 53. Steam for operating the air pump is supplied through pipe 54 and its flow is controlled by the throttle valve 55. Pump P3 delivers oil to the interior of the pipe 56, one end of which connects with the T $9^2$ and the other end of which is connected by means of a pipe 57 with the two parts 52 and 53 of the air compressor. A pressure relief valve 58 is connected between the outlet of T 9² and the air compressor and resists the flow of oil until the pressure reaches a predetermined value.

On a locomotive, the air pump operates more or less continuously and at times it operates at a very high speed and must therefore receive a variable amount of lubrication.

With the arrangement illustrated, whenever pump P3 is operating a certain amount of lubrication will be delivered to the air compressor, which amount is limited by a restricted opening R in the passage connecting the pump with the air compressor preferably some place in pipe 56. When the pump begins to operate at a high speed so as to increase the air pressure in the high pressure air line 59 beyond a predetermined value, this pressure is communicated through pipe 60 to cylinder 32b and moves the piston 33b upwardly, thereby closing the opening 19, whereupon the pressure in pipe 56 will build up until the relief valve 58 opens, whereupon a greater amount of oil will be delivered to the air compressor.

Figure 2:
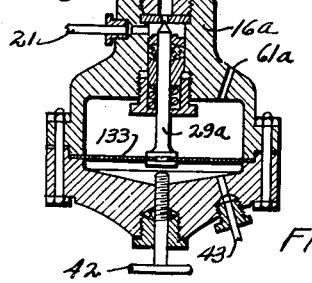
Figure 2 is a section through a modified form of valve mechanism.

In Figure 2 a cross section of a slightly different form of valve mechanism has been shown. In this embodiment, the part 16a corresponds to the valve body 16 shown in Figure 1 and the valve stem 29a corresponds to valve stem 29. Instead of a piston 33 a diaphragm 133 is used. The T 9 may be the same as the one shown in Figure 1 and pipes 8 and 10 communicate with the opposite ends of this T. Pressure is delivered to the lower side of the diaphragm through a conduit 43 and the valve can be manually closed by rotating the wheel 42. Pipe 61 and opening 61a are drains through which any liquid or steam that passes the piston or the diaphragm may flow.

Figure 3:
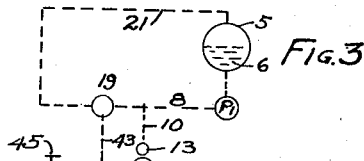
Figure 3 is a diagrammatic representation of the several elements comprising the lubricating system.

In the small diagram designated as Figure 3, the various elements have been shown in the relationship in which they appear in the drawing so as to facilitate and simplify an understanding of the system.

It will be observed that in either case the lubricant is directed to the engine or to the pump whenever the latter operate and is controlled by pressure supplied to these machines either by the pressure of the steam used to operate the engine portion, or by pressure developed on the delivery sides of the pumps. Since all of the machines shown are steam driven, the pressure can be obtained from the steam supply pipe between the throttle valve and the engine portion, but in the embodiment illustrated the pressure for controlling the lubrication of the feed water pump and the air pump has been shown as derived from the delivery sides of these machines.

In case an electric motor is employed instead of a steam engine, it is evident that the normally open control valve can be closed by means of an electromagnet instead of by the piston and cylinder illustrated, and applicant therefore does not want to be restricted to a pressure operated valve, but wants it to be understood that any mechanical equivalent for this is intended to be covered by the claims.

Having described the invention what is claimed as new is:

1. An automatic lubricating system, comprising, in combination, an oil reservoir, a constantly operating pump, a conduit connecting the intake port of the pump with the oil in the reservoir, a return conduit connecting the discharge port of the pump with the reservoir, whereby when the pump operates oil will flow from the reservoir, through the pump and return to the reservoir, a normally open valve in the return conduit, a machine to be lubricated, a conduit having one end in communication with the return conduit between the pump and the valve and the other end connected with the machine, a pressure responsive valve in the last named conduit, which prevents oil from flowing to the machine when the first mentioned valve is open and which opens in response to the increased pressure developed when the first valve is closed, whereby oil will flow to the machine, and means responsive to the operation of the machine for closing the normally open valve when the machine operates whereby oil will be forced into the machine and lubricate the same.

2. An automatic lubricating system, comprising, in combination, an oil reservoir, a constantly operating pump, a conduit communicating the intake port of the pump with the oil in the reservoir, a return conduit connecting the discharge port of the pump with the reservoir, whereby when the pump operates, oil will flow from the reservoir, through the pump and return to the reservoir, a normally open pressure responsive valve in the return conduit, a machine to be lubricated, a conduit having one end in communication with the return conduit between the pump and the normally open valve and the other end in communication with the machine, means associated with the machine for producing a supply of fluid under pressure whenever the machine operates, and means comprising a conduit for establishing connection between the fluid under pressure and the pressure operated valve, whereby the latter will close whenever the machine operates, and whereby oil will flow to the machine whenever it operates.

3. An automatic lubricating system, comprising, in combination, an oil reservoir, a constantly operating pump, a conduit connecting the intake port of the pump with the oil in the reservoir, a return conduit connecting the discharge port of the pump with the reservoir, whereby when the pump operates, oil will flow from the reservoir, through the pump and return to the reservoir, a normally open pressure responsive valve in the return conduit, a machine to be lubricated, a conduit having one end in communication with the return conduit between the pump and the normally open valve and the other end in communication with the machine, a pressure responsive valve in the last named conduit, which prevents oil from flowing to the machine while the valve in the return conduit is open and which opens in response to the increased pressure developed when said valve is closed, whereby oil will flow to the machine, when the pressure operated valve in the return conduit is closed, means associated with the machine for producing a supply of fluid under pressure whenever the machine operates, and means comprising a conduit for establishing a connection between the fluid supply and the normally open valve for closing the latter whenever the machine operates.

4. A device in accordance with claim 1 in which manually operable means is provided for closing the normally open valve and to retain it in closed position independently of the operation of the machine.

5. A device in accordance with claim 2 in which manually operable means is provided for closing the normally open valve and to retain it in closed position independently of the operation of the machine.

6. A device in accordance with claim 3 in which manually operable means is provided for closing the normally open valve and to retain it in closed position independently of the operation of the machine.

7. An automatic lubricating system, comprising in combination, an oil reservoir, a constantly operating pump, a conduit connecting the intake port of the pump with the oil in the reservoir, a return conduit connecting the discharge port of the pump with the tank, whereby when the pump operates oil will flow from the reservoir, through the pump and return to the reservoir, a normally open valve in the return conduit, a machine to be lubricated, a conduit having one end in communication with the return conduit between the pump and the valve, a pressure responsive relief valve in the last named conduit which prevents the flow of oil to the machine when the valve in the return conduit is open and which opens in response to increased pressure developed when the last mentioned valve is closed, to allow oil to flow to the machine, a constantly open conduit between the pump and the machine, in parallel with the conduit that contains the relief valve and through which oil is constantly supplied to the machine, and means operated when the machine exceeds a predetermined rate of operation, for closing the normally open valve whereby sufficient pressure is produced to open the relief valve and permit an additional amount of oil to flow to the machine.

PAUL F. GIESKIENG.